July 18, 1939.  J. J. DESMOND  2,166,890
BOILER SHEET AND TUBE CONNECTION AND METHOD OF MAKING SAME
Filed Sept. 17, 1936
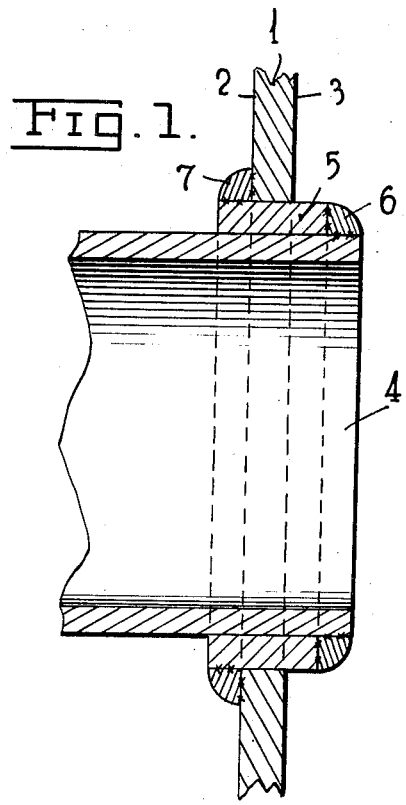
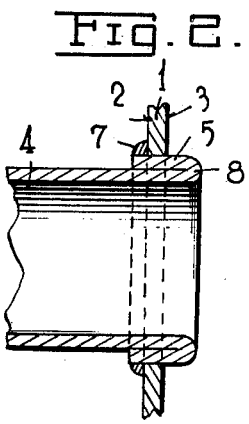
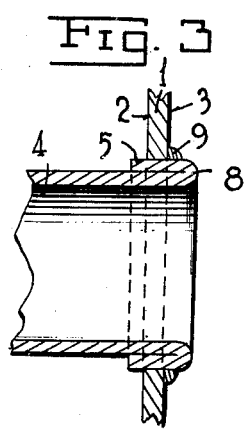
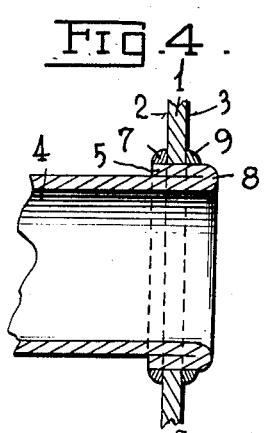
Inventor
Jeremiah J. Desmond
By Dyer + Kirchner
Attorneys Patented July 18, 1939

2,166,890

UNITED STATES PATENT OFFICE 2,166,890

BOILER SHEET AND TUBE CONNECTION AND METHOD OF MAKING SAME

Jeremiah J. Desmond, Washington, D. C., assignor of one-half to John R. Grove, Washington, D. C.

Application September 17, 1936, Serial No. 101,325

4 Claims. (Cl. 29—157.5)

My invention relates to improvements in boiler constructions, and more particularly aims to provide an improved connection between the firebox sheet and a water tube. Thus, although the structure contemplated by the invention is broadly speaking of general application, wherever a sheet and tube connection is to be made, certain characteristics of the joint which embodies the invention render it of peculiar value under the temperature conditions which prevail in steam boilers, where for example the temperature varies widely at different times, as between periods of use and non-use, and where during periods of use the temperature on the fire side of the tube and sheet is much higher than on the water side.

In locomotive boiler constructions particularly the connection of the water tube to the throat sheet has been the source of considerable trouble. The present standard practice, adhered to because previous attempts to improve it have been uniformly unsuccessful, is to roll the tube into an opening formed in the sheet. A steamtight union is provided by this operation when skillfully and painstakingly performed, but after a comparatively short period of service the joint opens under the stress of the expansive and contractile movements of the tube. Repeated re-rolling of the tube in the sheet opening results in a thinning of the metal of the tube and reduces the sheet opening to an out-of-round condition which is obviously undesirable, particularly when a replacement tube is to be accommodated.

Welding the tube to the sheet is unsatisfactory because the weld penetrates a very considerable portion of the tube thickness and seriously weakens the tube by working changes in the crystalline structure of the metal. Welding the tube to the fire side of the sheet is very properly considered poor practice, and it is of course physically impossible to form a weld on the water side because the parts of the sheet and tube there in contact become inaccessible to the welder and the welding apparatus as soon as the tube is inserted in the sheet.

It has been proposed to provide the end of the tube which is to be inserted in the sheet opening with a sleeve which is shrunk, upset or swaged onto the tube end or is secured thereto by rivets or patch-bolts, the sleeve being in turn welded into the sheet opening. This expedient has been found unsatisfactory. Unless the sleeve be riveted or bolted to the tube the sleeve-tube bond is no better than the standard connection between the tube and sheet, effected by rolling, and the sleeve is superfluous. If the sleeve is riveted or bolted to the tube the latter is materially weakened by the ring of holes made to admit the rivets or bolts. This objection is particularly serious in cases where the tube is of small diameter or its wall is relatively thin, and a bad construction is made worse when the holes are enlarged to countersink the rivets or bolts.

An object of my invention is to provide an improved construction which eliminates the difficulties noted above. More specifically the invention contemplates a tube and sheet connection which will be leakproof and remain leakproof throughout heretofore unattainably long periods of boiler operation, which can be installed easily and inexpensively, and which is not counter to good boiler shop practice.

Generally speaking, the invention contemplates forming a sleeve on the sheet-receiving end of the tube, either by inverting an integral cuff on the tube or by telescoping over the end portion of the tube an originally independent sleeve which is welded to the tube at the juxtaposed terminals of both, and then welding the sleeve to the sheet. The sleeve is thus secured to the tube by an exceedingly strong bond and is similarly strongly fixed to the sheet. The tube is not weakened, and inasmuch as nothing is welded to the tube on the fire side, no weld is subjected to destructive pressure differentials, as will be hereinafter more fully explained.

The invention is illustrated in certain preferred forms of embodiment on the accompanying drawing in which similar reference characters designate the same part in the several views, and in which:

Figure 1 is a cross sectional view of an embodiment of the invention in which a sleeve of originally independent metal is welded onto the tube end; and Figs. 2, 3 and 4 are similar views, on a relatively reduced scale, showing various modified constructions in which the sleeve is an integral cuff turned back on the tube exterior.

In the drawing the reference numeral 1 designates a boiler sheet, which may be the throat sheet of a locomotive firebox, 2 being the fire side and 3 being the water side. A water tube 4 is connected to the sheet, and both the sheet and the tube are of the customary iron, steel or other ferrous metal. While dimensions are, broadly speaking, immaterial, it will be helpful to remember that in a typical locomotive construction these tubes average about ten feet in length and have an outside diameter of three inches and a wall thickness of three-sixteenth inch. Pressures are carried up to 350 pounds per square inch and steam temperatures up to approximately 450° F. In such a locomotive the sheet 1 would have a thickness of about three-eights inch. It will be appreciated that under operating conditions the pressure differential imposed on the portion of the tube which is in the firebox is very high, being equal to the internal pressure of 350 less the atmospheric pressure of 15 in the firebox. The portion of the tube in the firebox thus tends to expand in two directions: radially under this unbalanced internal pressure and longitudinally under the high temperature of the fire. The effect of this combination of forces, which is aggravated by corresponding contractile stresses set up when the fire cools and becomes extinguished, is to impose severe strain on the circular zone of the tube at its fire side junction with the sheet, making this zone the so-called "critical point" at which failure of the tube itself or of the tube-sheet bond is most apt to occur. I think it important that this zone be not weakened, as by forming rivet or bolt holes or by impairing the crystalline structure of the tube metal by welding. I think it desirable to strengthen this zone. This is accomplished by the invention, and I consider this accomplishment one of the important features of the invention.

In Fig. 1 I show a bushing or sleeve 5 more or less tightly received over the end portion of the tube and made integral therewith by welding together the juxtaposed terminal ends of the sleeve and tube. A convenient and preferred welded connection may be made by longitudinally spacing the terminal ends, as by spacing the sleeve slightly short of the tube end and filleting with weld metal 6 the annular pocket thus formed. The sleeve and tube are thus made effectively integral, and the welded connection 6 is, when the assembled tube and sleeve are inserted through the opening in the sheet 1, disposed on the water side 3 of the sheet, where pressures on all sides of the weld 6 are at all times balanced, so that boiler pressure has no destructive effect whatever on the weld. The sleeve is made of such length that, when the sleeve and tube assembly is fitted in the sheet opening, a sufficient length of sleeve extends from the sheet on its fire side 2 to form with the sheet an annular pocket, which is filleted with weld metal 7. The sleeve is thereby bonded to the sheet. The critical zone of the tube, referred to hereinabove, is backed and reinforced by the extending length of sleeve, and the harmful effect of pressure differentials at this zone is thereby greatly reduced. With regard to longitudinal expansion and contraction of the tube, also noted above, it will be observed that both fillets 6 and 7 divide these stresses, each taking theoretically half. In practice I have found that the load thus imposed on each fillet is well within its capacity to withstand over long periods of boiler operation.

The foregoing being the structure of the joint in one embodiment, its method of fabrication and the sequence of steps used in forming it are thought to be obvious. Suffice it to say that ordinarily the sleeve and tube are first joined, and then this assembly is mounted in the sheet opening and the sleeve is welded to the sheet. This sequence is of course the only one practicable where, as in the case of most locomotive boilers, the water side of the sheet is inaccessible after the sheet opening is closed by insertion of the tube.

In Figs. 2, 3 and 4, the sleeve or bushing 5 is an originally integral part of the tube, being a cuff turned back on the tube exterior. I consider the integral segment of metal designated 8, at the juncture of the tube proper and the inverted cuff portion thereof, a counterpart of the weld fillet 6 of Fig. 1, inasmuch as the net result of the constructions shown by all the figures is an effectively integral combination of tube and external sleeve.

Figs. 2, 3 and 4 differ from each other in their placement of a weld fillet corresponding to that designated 7 in Fig. 1, by which the sleeve 5 and sheet 1 are united. Thus, in Fig. 2 a fillet 7 is placed precisely as in Fig. 1. In Fig. 3 the sleeve and sheet bond is made by a fillet 9 on the water side of the sheet, and in Fig. 4 a combination of fillets 7 and 9 is used. Of course, welding at 9 is impracticable in representative locomotive boiler constructions, but it is possible in certain other types of boilers, notably some designed for stationary and marine service.

In each form of construction the tube and sleeve assembly may be preliminarily rolled into the sheet opening, but this is not essential. It is principally useful in fixing the tube and sheet relationship during the welding operation.

As will be obvious, the joint herein described is an improvement in the prior art joints and is intended to be used in place of such prior joints in new as well as old installations. I wish to point out, however, that the welded connection 7 or 9, as well as the connections 7 and 9 (Fig. 4) admirably adapt the joint to be used as a replacement for old sheet and tube junctions in cases where repeated repairs involving rolling have made the sheet opening out-of-round. In practicing my invention such malformation of the sheet opening can be fully corrected by reaming the opening to perfectly round contour and using a sleeve of correspondingly larger outside diameter.

The illustrated and described embodiments have been selected merely to exemplify the invention and not to limit it. The invention is capable of embodiment in other and further modified forms, and all such modifications, to the extent that they incorporate the principles of the invention as defined by the appended claims, construed in the light of this specification and limited only by their express terms and the state of the prior art, are to be deemed within the scope and purview of such claims.

I claim:

1. In a tube connection for a metal firebox sheet having a fire side and a water side and having an opening, a tube, a sleeve fitting snugly in the opening, disposed over an end portion of the tube and terminating on the water side of the sheet in spaced relation to the sheet and in longitudinally spaced relation to the end of the tube to provide an annular pocket defined by the adjacent walls of the tube and sleeve, weld material filling said pocket bonding the sleeve to the tube and confined within the peripheral plane of the outer surface of the sleeve, and weld material filling the pocket defined by the fire side of the sheet and the adjacent outer surface of the sleeve, said weld material bonding the sleeve to the sheet substantially wholly on the fire side of the sheet so that it may be removed without appreciably enlarging the opening in the sheet, and the portion of the sleeve interposed between the last named weld material and the tube protecting the tube from injury by the heat incident to applying or removing said weld material.

2. The method of connecting a tube to a sheet in a heat exchange device having a high pressure side and a low pressure side which comprises inserting an end portion of the tube in a sleeve so as to leave an annular pocket defined by the end portions of the tube and sleeve, securing the tube and sleeve together by weld material applied in said pocket and confined within the peripheral plane of the outer surface of the sleeve, forming an opening in the sheet of substantially the outside diameter of said sleeve, inserting the sleeve and tube assembly into the opening in the sheet from the low pressure side so that the sleeve fits snugly in the opening and the welded end portions project from the high pressure side and terminate in spaced relation to the high pressure side, and then welding the sleeve to the low pressure side only of the sheet, whereby the sleeve and tube assembly can be subsequently withdrawn from the sheet by removing the weld material from the low pressure side of the sheet without enlarging the opening in said sheet.

3. The method of connecting a tube to a metal firebox sheet having an accessible fire side and an inaccessible water side which comprises disposing an external sleeve on an end portion of the tube with the ends of the sleeve and tube in axially spaced relation so that the end portions of the sleeve and tube define an annular pocket, applying weld metal to said pocket and confining the same within the peripheral plane of the outer surface of the sleeve to secure the sleeve to the tube, forming an opening in the sheet of substantially the outside diameter of said sleeve, inserting the sleeve and tube assembly into the opening in the sheet from the fire side so that the sleeve fits snugly in the opening and the tube and sleeve project from the fire side and the end of the sleeve on the water side of the sheet is spaced therefrom, and then welding the sleeve to the surface of the fire side only of the sheet, whereby the sleeve and tube assembly can be subsequently withdrawn from the sheet by removing the weld material from the fire side of the sheet without enlarging the opening in said sheet.

4. The method of connecting a tube to a sheet in a heat exchange device having a high pressure side and a low pressure side which comprises forming on an end portion of the tube an external sleeve shorter than the tube and longer than the thickness of the sheet and having its end axially spaced from the end of the tube so that the end portions of the sleeve and tube define an annular pocket, applying weld metal to said pocket and confining the same within the peripheral plane of the outer surface of the sleeve to secure the sleeve to the tube, forming an opening in the sheet of substantially the outside diameter of said sleeve, inserting the sleeve and tube assembly into the opening in the sheet from the low pressure side so that a portion of the sleeve fits snugly in the opening and projects from the low pressure side and forms therewith an annular pocket substantially completely closed at its bottom by the contacting surfaces of the sleeve and the wall of the opening in the sheet, and so that the end of the sleeve on the high pressure side of the sheet is spaced therefrom, and then filling said last named pocket with weld metal to weld the sleeve to the sheet, whereby the material of the sleeve between the weld metal and the tube protects the tube during the welding operation, whereby the sleeve and tube assembly can be subsequently withdrawn from the sheet by removing the weld material from the low pressure side of the sheet without enlarging the opening in said sheet.

JEREMIAH J. DESMOND.